April 1, 1958     J. PIGNONE     2,829,026
RECORDER PEN
Filed Oct. 29, 1956
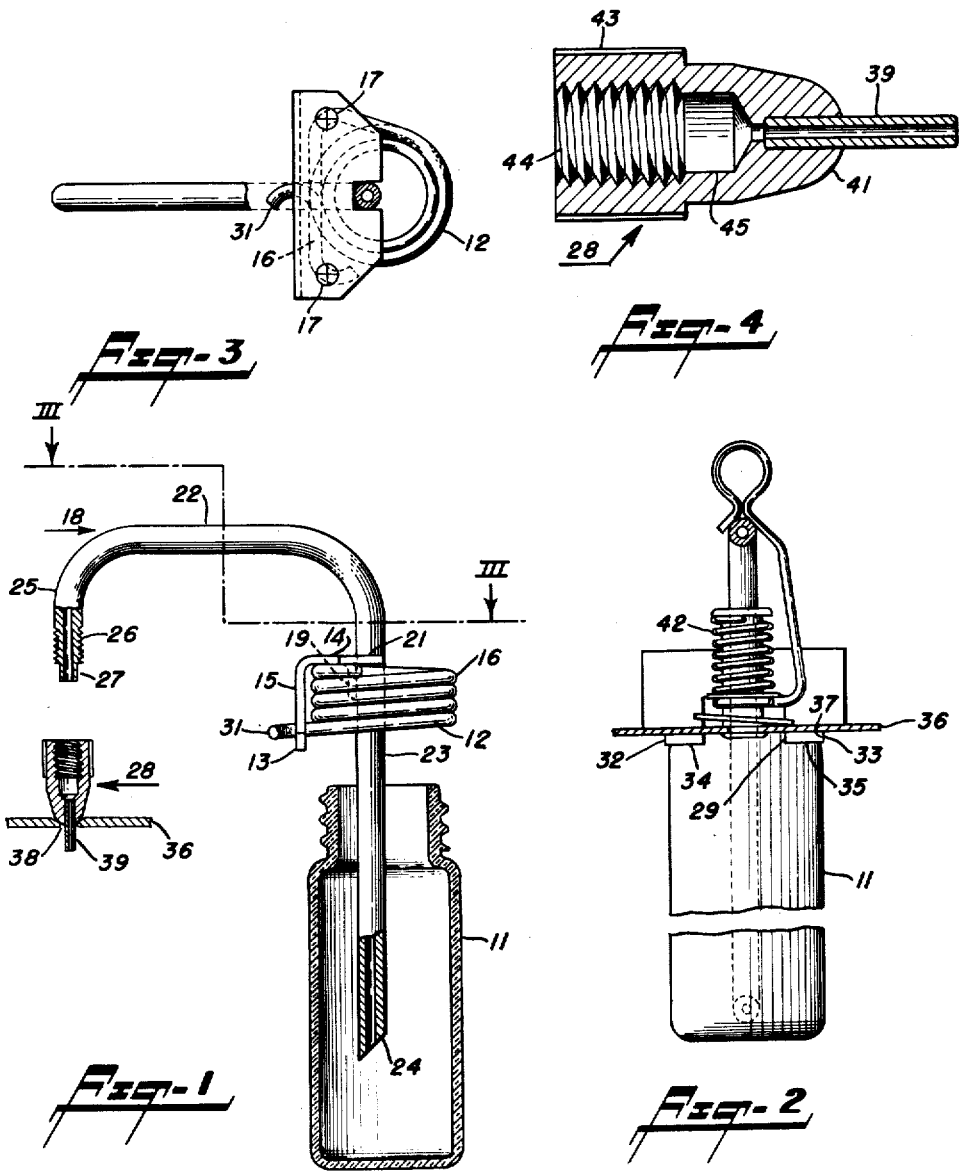
JOSEPH PIGNONE
INVENTOR.

United States Patent Office 2,829,026
Patented Apr. 1, 1958

2,829,026
RECORDER PEN

Joseph Pignone, West Orange, N. J., assignor to Weston Electrical Instrument Corporation, Newark, N. J., a corporation of New Jersey Application October 29, 1956, Serial No. 618,993

8 Claims. (Cl. 346—140)

This invention relates to improvements in automatic indicating and recording apparatus and, more particularly, to a novel construction of a recording pen adapted for such apparatus.

Recorders of the type to which this invention relates are useful in providing a measurement and record of variable conditions, such as temperatures. However, they are also designed to measure and record output from such primary elements as thermocouples, tachometer generators, photoelectric cells, resistance thermometer bulbs, and any transducer that provides an electrical output. Such recorders can also be employed to measure flow, pressure and weight by using suitable converters to provide an electrical output.

The indication and recording of the instantaneous state of a variable condition is usually accomplished by electrical networks which are adapted to be unbalanced by a variation in the condition and to effect an operation of a suitable rebalancing means. Such rebalancing operations include the actuation of suitable power means for simultaneously moving an inking pen or stylus over a constantly-movable, calibrated chart. In present recorders the pen and associated components are of complicated, delicate and costly construction.

An object of this invention is provision of a novel recorder pen which, specifically, is an improvement over the glass pen disclosed in the Bartley et al. Patent No. 2,673,138, dated March 23, 1954.

An object of this invention is the provision of a pen structure employing an ink reservoir consisting of a molded threaded glass vial of extremely low cost and commonly available for replacement, whereby a quickly accessible ink supply is afforded by a number of filled spare vials.

An object of this invention is to provide a pen assembly particularly adapted for recording apparatus employing a reservoir made from a threaded glass vial which is locked frictionally in a helical spring seat, and which can be unscrewed only by manually pressing a projecting tail of said spring in a tangential unwinding direction.

An object of this invention is to provide a pen particularly adapted for use in recorders, in which cleaning is effected with extreme ease by virtue of using an unobstructed capillary tube, with which a stylus of selected bore may be used, and where a vibration-free, three point leveling support of the pen may be provided by reason of a turning contact of a convex or substantially hemispherical tip of the pen point assembly on a conical seat and the transverse support of the pen bridge at two notched ends.

These and other objects and advantages will become apparent from the following detailed description when taken with the accompanying drawings. It will be understood that the drawings are for purposes of illustration and do not define the scope or limits of the invention, reference being had for the latter purpose to the appended claims.

In the drawings, wherein like reference characters denote like parts of the several views:

Figure 1 is an exploded side elevational view of a pen assembly embodying my invention, with a part in axial section;

Figure 2 is a front elevational view showing the pen assembly mounted on a carriage plate or support;

Figure 3 is a plan, with parts in horizontal section on the line III—III Figure 1, in the direction of the arrows;

Figure 4 is an enlarged axial sectional view of the pen point assembly.

Referring to the drawings in detail, there is illustrated a pen particularly adapted for use in a recorder. It contrasts with the pen of the Bartley et al. patent previously referred to, which is all glass except for the stylus, in that it is all metal except for the reservoir. Specifically, the disclosed embodiment of my novel pen comprises a threaded glass vial 11 screwed into and retained frictionally by a helical spring 12. The spring 12 is in turn secured, desirably by spot welding, to a bridge 13 desirably formed of stainless steel. This bridge 13, desirably of angular form, comprises a normally upper flange 14, and a flange 15 depending therefrom.

The normally upper end of the spring is desirably somewhat expanded and shaped, as illustrated most clearly in Figure 3, so as to provide a relatively large base for such spot welding to the under surface of the flange 14, as at points 17. The neck of the pen is formed as a capillary tube 18 of metal, desirably stainless steel, and is also attached to the bridge 13. This attachment is desirably provided for by slitting the upper flange 14 of the bridge to form a tab 19, and then bending that tab therefrom, leaving a notch 21. The connection is then desirably effected by brazing the capillary tube 18 to not only the notched portion of the upper flange 14, but also the depending tab 19, thereby providing a firm and rigid union.

The capillary tube 18 forming the pen neck is desirably generally of inverted J or inverted nearly U shape in side elevation, as viewed in Figure 1. The side portions of said capillary tube are thus of unequal length and connected by an intermediate portion 22. The longer side portion 23 has its end desirably beveled, as indicated at 24, and is connected, as by brazing, to the tab 19 and/or the upper flange 14 of the bridge 13. The shorter side portion 25 has its end portion threaded as indicated at 26 and faced off as indicated at 27 to receive a pen tip assembly, generally designated 28.

The depending flange 15 of the bridge has not only a center notch 29, through which the tail 31 of the free or lower end of the spring 12 extends, but it also has two end notches 32 and 33 forming depending tabs 34 and 35 which are receivable in a supporting member or plate 36, which is desirably the top flange or web of a supporting carriage for the pen. These tabs, therefore, desirably pass through an aperture or slot 37 in a supporting carriage or plate 36, with their outer edges disposed between portions of said member which define said slot, thereby positively positioning and supporting the pen with respect to said carriage or plate at two points. Said carriage member or plate 36 is also desirably provided with a countersunk hole 38 which receives the stylus 39 of the pen point assembly and is adjustably engaged by the hemispherically or convexly curved lower end 41 of the body portion of said assembly. The pen is desirably spring-loaded so as to be resiliently pressed into engagement with the carriage or plate 36, as by having resilient means, diagrammatically indicated as a helical spring at 42, pressing downwardly on the intermediate portion 22 of the capillary tube 18.

Referring now to Figure 4, illustrating details of the pen point assembly 28, there is shown that this assembly comprises a body portion 43 desirably formed of stainless steel, knurled on its exterior surface as indicated, internally threaded at 44, and faced at 45, to snugly in a fluid-tight manner receive and connect with the faced and/or threaded end portion 17 of the capillary tube 18, upon being finger-tightened thereon. The stylus 39 of the pen point is desirably formed as a capillary tube of platinum 10% iridium alloy, and the ink-dispensing bore of it may be varied in accordance with the width of the line to be drawn. The stylus 39 may be, before a final polishing, force-fitted into the hemispherical end portion of the body of the pen point assembly.

From the foregoing disclosure it will be seen that I have provided a pen particularly adapted for recorder use, which has various advantages which have been proved by extended tests and applications. The threaded glass vial 11 is extremely low in cost, rugged, and such as is commonly available for replacement. A quickly accessible ink supply is afforded by a number of filled spare vials, which may be plastic capped and held in a clip mounted in the recorder case or frame. The vial in use is locked frictionally in its helical spring seat, and although it is readily screwed to the position illustrated in Figure 2 from that of Figure 1, it can be unscrewed only upon manually pressing the projecting spring tail 31 in a straightening or unwinding tangential direction to release the grip on the threaded portion of the vial 11.

The capillary tube 18, by virtue of its being unobstructed, is easily cleaned upon unscrewing the pen tip assembly and vial therefrom. Tips having styluses in various bores are easily substituted. This is in contrast with the glass recorder pen, previously referred to, which is extremely difficult to clean, expensive and fragile. Also, because of the unavoidable annealing of its metal ink-dispensing stylus during the process of fusing it into the extremity of the glass capillary tube, said stylus is easily bent from a desired true radial alignment with the paper chart roll. The pen is vibration-free by reason of its three-point self leveling support and turning contact between the hemispherical pen tip and its conical seat formed at the beveling of the stylus-receiving aperture in the carriage or plate 36, and the transverse support for the pen bridge as provided at its two notched ends.

Because of the accuracy with which the metal capillary tube can be machined and bent in manufacture, perfect axial alignment of the stylus with relation to the chart roll can be assured. The ink-dispensing or writing end of the stylus is faced off, finished, and highly polished after assembly with the knurled body and the hard-drawn fine capillary tube. This assures that the concentric, circularly polished end is not marred or deformed by pressing or other equivalent subsequent assembly operation.

Having now described my invention in detail in accordance with the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A pen adapted for use in a recorder, comprising a supporting bridge, a helical spring adapted to receive the threaded end portion of an ink reservoir, the upper end portion of said spring being secured to said bridge and the lower end of said spring terminating in a manually-operable portion, a metal capillary tube having side portions of unequal length connected by an intermediate portion, the longer side portion being secured to said bridge and passing through said spring for reception in the reservoir and the shorter side portion having a threaded end, and a pen tip member comprising a body portion threaded to receive the threaded portion of said capillary tube and from which an ink-dispensing stylus extends.

2. A pen adapted for use in a recorder, comprising a bridge having an upper flange from which another flange depends, a helical spring adapted to receive the threaded end portion of an ink reservoir, the upper end portion of said spring being secured to the under surface of said upper flange, and the lower end of said spring terminating in a manually-operable portion, a metal capillary tube having side portions of unequal length connected by an intermediate portion, the longer side portion being secured to said upper flange and passing through said spring for reception in the reservoir, the shorter side portion being externally threaded, a pen tip member comprising a body portion convexly curved for adjustable reception in a countersunk aperture in a carriage member and internally threaded to connectingly receive the threaded portion of said capillary tube, and an ink-dispensing stylus extending from said body portion.

3. A pen adapted for use in a recorder, comprising a supporting bridge having an upper flange from which another flange depends, a helical spring adapted to receive the threaded end portion of an ink reservoir, the upper end portion of said spring being secured to said bridge and the lower end of said spring terminating in a manually-operable portion, a metal capillary tube having side portions of unequal length connected by an intermediate portion, the longer side portion being secured to said bridge and passing through said spring for reception in the reservoir, the shorter side portion being externally threaded, and the intermediate portion being adapted for engagement by resilient means for holding said tube in place on a carriage member, and a pen tip member comprising a body portion internally threaded to receive the threaded portion of said capillary tube and from which an ink-dispensing stylus extends, said body portion being convexly curved for adjustable reception in a countersunk aperture in a carriage member.

4. A pen adapted for use in a recorder comprising a threaded glass vial for holding ink, a helical spring adapted to receive the threaded end of said vial, a supporting bridge comprising an upper flange from which another flange depends, the upper end portion of said spring being welded to the under surface of said upper flange and the lower end of said spring terminating in a manually-operable portion, a metal capillary tube having side portions of unequal length connected by an intermediate portion, the longer side portion passing through a notch in the edge of said upper flange, formed by bending down a tab therefrom, and through said spring for reception in the vial, and brazed to said upper flange and its bent down tab, the shorter side portion being externally threaded at its end, a pen tip assembly member comprising a body portion internally threaded to receive the threaded portion of said capillary tube and from which an ink dispensing stylus extends, said body portion being convexly curved for adjustable reception in a countersunk aperture in a carriage member.

5. A pen adapted for use in a recorder comprising a threaded glass vial reservoir for holding ink, a helical spring adapted to receive the threaded end portion of said vial, a supporting bridge, the upper end portion of said spring being welded to said bridge, and the lower end portion of said spring terminating in a manually-operable tail portion, a metal capillary tube having side portions of unequal length connected by an intermediate portion, the longer side portion passing through said spring for reception in the vial and brazed to said bridge, the shorter side portion being externally threaded and the intermediate portion being adapted for engagement by resilient means for holding said tube in place on a carriage member, a pen tip member comprising a body portion internally threaded to receive the threaded portion of said capillary tube and from which an ink dispensing stylus extends, said body portion being convexly curved for adjustable reception in a countersunk aperture in a carriage member.

6. A recorder pen comprising a threaded glass vial for holding ink, a helical spring into which said vial is screwed for frictionally retaining the same, an angular supporting bridge comprising an upper flange from which another flange depends, the upper end portion of said spring being welded to the under surface of said upper flange, said other flange having a central notch in its lower edge portion and the lower end of said spring terminating in a manually-engageable portion projecting through said central notch in said depending flange, a neck portion for said pen consisting of a generally inverted J-shaped metal capillary tube having side portions of unequal length connected by an intermediate portion, the longer side portion passing through a notch in the edge of said upper flange, formed by bending down a tab therefrom, and through said spring for reception in the vial and brazed to said upper flange and its bent-down tab, the shorter side portion being externally threaded and faced at its end, the intermediate portion being adapted for engagement by resilient means to hold said pen in place on a carriage member, the depending flange also having a notch at each end leaving depending tabs receivable in a slot in said carriage member, with their sides disposed between portions of said carriage member defining said slot, a pen tip assembly comprising a knurled body member internally threaded to receive the threaded and faced end portion of said capillary tube and an apertured end portion, a pen stylus tightly received in said apertured portion, said apertured portion being generally hemispherically curved about said stylus for adjustable reception in a countersunk aperture in said carriage member.

7. A recorder pen comprising a threaded glass vial as a reservoir for holding ink, a helical spring into which said vial is screwed for frictionally retaining the same, an angular supporting bridge comprising an upper flange from which another flange depends, the upper end portion of said spring being welded to the under surface of said upper flange, said other flange having a central notch in its lower edge portion and the lower end of said spring terminating in a manually-engageable portion projecting through said notch in said other flange, the neck portion for said pen consisting of a generally inverted J-shape metal capillary tube having side portions of unequal length connected by an intermediae portion, the longer side portion passing through a notch in the edge of said upper flange formed by bending down a tab therefrom, through said spring for reception in the vial, and brazed to said upper flange and its bent down tab, the shorter side portion being formed for connection with a pen tip assembly at its end, the intermediate portion being adapted for engagement by resilient means to hold said pen in place on a carriage member, the depending flange also having a notch at each end leaving depending tabs receivable in a slot in said carriage member, with their sides disposed between portions of said carriage member defining said slot, and a pen tip assembly connected to said shorter side portion and comprising an ink-dispensing stylus.

8. A recorder pen comprising a threaded glass vial as a reservoir for holding ink, a helical spring into which said vial is screwed for frictionally retaining the same, a supporting bridge comprising a depending flange portion having a central notch in its lower edge portion, and the lower end of said spring terminating in a manually-engageable portion projecting through said notch, a neck portion for said pen consisting of a generally inverted J-shaped metal capillary tube having side portions of unequal length connected by an intermediate portion, the shorter side portion being externally threaded at its end, said depending flange portion also having a notch at each end leaving depending tabs receivable in a slot in a carriage member, with their sides disposed between portions of said carriage member defining said slot, the pen tip assembly comprising a knurled body member internally threaded to receive the threaded end portion of said capillary tube, and an apertured end portion, a pen stylus tightly received in said apertured portion, said apertured portion being convexly curved about said stylus for adjustable reception in a countersunk aperture in said carriage member.

No references cited.